United States Patent Office 3,337,635
Patented Aug. 22, 1967

3,337,635
METHOD OF PRODUCING KETOLS FROM HYDROCARBONS
Charles J. Norton, Denver, Colo., and Ronald E. White, Iowa City, Iowa, assignors to Marathon Oil Company, Findlay, Ohio, a corporation of Ohio
No Drawing. Filed Nov. 9, 1964, Ser. No. 409,953
6 Claims. (Cl. 260—594)

This invention relates to a method of producing oxidation products of unsaturated hydrocarbons. More particularly, this invention relates to the production of polyhydric, hydroxycarbonyl and dicarbonyl derivatives of unsaturated hydrocarbons and, in its more specific and especially proferred aspects, to the production of alpha ketols and polyhydric alcohols by the oxidation of olefinic hydrocarbons under certain conditions hereinafter described in detail and set forth in the appended claims.

The oxidation of unsaturated hydrocarbons, particularly olefinic hydrocarbons, has been the subject matter of numerous patents and articles over the years. Despite the widespread interest accorded to the oxidation reactions of such compounds, and to the products produced thereby, these remain voids, esepecially from the standpoint of practical desiderata, relating to methods of producing certain oxidation products of unsaturated hydrocarbons, particularly of olefinic hydrocarbons. More specifically in this connection, the production of alpha ketols, in particular, hydroxy acetone, better known as acetol, so far as can be determined, has never been produced in any commercially significant yields by oxidation of an olefinic hydrocarbon. U.S. Patent No. 2,689,253, while, in the main, being concerned with the production of propylene oxide by vapor phase partial oxidation of propylene, discloses the formation of acetol as a by-product, There is, however, no mention in the patent with respect to yields of acetol obtained and, so far as appears, they are not significant. The literature treating of the production of acetol indicates that it can be obtained in modest yields by indirect methods, one such method involving the bromination of acetone followed by solvolyzing with potassium formate to produce the formate ester of acetol which then is transesterified with methanol to recover acetol.

In accordance with the present invention, a unique method of producing oxidation products of unsaturated hydrocarbons is provided which has been found not only to have general applicability with respect to the production of valuable oxidation products from both olefinic and acetylenic hydrocarbons, but which has marked applicability with respect to the production of polyhydric, hydroxycarbonyl and dicarbonyl derivatives of olefinic hydrocarbons, especially the lower members of that group of compounds. Thus, while the method of the present invention will be described in detail hereinafter with particular reference to the utilization of a lower olefinic hydrocarbon, that is, propylene, as a principal starting material, it should be understood that such description is presented only by way of illustrating the invention and should not be construed as limitative of its broader applicability. Exemplary of other olefins having utility in the method of the invention are ethylene, butenes, isobutylene, pentenes, 2-methylbutene, hexenes, heptenes, octenes, such as n-octenes and isooctene, styrene, stilbenes, and the like. Exemplary of acetylenic hydrocarbons that can be employed in the method are acetylene, metylacetylene, ethylacetylene, dimethylacetylene, 2-butyne, pentyne, 3-methylbutyne, hexyne, 3,3-dimethylbutyne-1, heptyne, octyne, octdecyne, and the like.

In carrying out the method of the present invention, it has been discovered that good yields of acetol and, to a lesser extent, propylene glycol, for example, can be obtained by reacting propylene with hydrogen peroxide in the presence of an oxidizing catalyst under conditions to be described hereafter in detail. The hydrogen peroxide component employed in the reaction may vary considerably in concentration and most advantageously is incorporated into an organic solvent which is inert or essentially inert to any of the reactants, products or reaction conditions involved in the method of this invention. Generally speaking, the concentration of hydrogen peroxide in the organic solvent desirably will range from about 1 to 50 volume percent, although it is more convenient to work with concentrations ranging from 5 to 30 volume percent, and especially desirably 6 to 8 volume percent. The hydrogen peroxide utilized in forming organic solvent solutions of the stated concentrations is available commercially as aqueous solutions of strength of about 27 to 98 weight percent, or more. For the purposes of this invention, the high strength solutions, that is, those ranging from 90 to 98 weight percent, or more, are preferred. Exemplary of such solutions are those products sold under the trade designations "Perone" or "Becco."

The concentration of the hydrogen peroxide component utilized in the method of this invention, among other factors, tends to influence the yields of products obtained. Thus, for example, while acetol can be produced in accordance with the practice of the invention at molar concentrations of hydrogen peroxide in the organic solvent in the range of 1 to 2, or higher, other conditions being equal, materially increased yields of acetol are obtained at molar concentrations of hydrogen peroxide in the organic solvent ranging from about 0.1 to 0.9, especially desirably from about 0.2 to 0.5. The practicalities, both from a production and a material cost standpoint, of employing lower concentrations of hydrogen peroxide, therefore, are apparent.

The organic solvent, or compatible mixtures thereof, utilized as a vehicle for the hydrogen peroxide may be selected from a wide group. These include, by way of example, tertiary alcohols such as tert-butyl and tert-amyl alcohols; lactones exemplified by gamma-butyrolactone and gamma-valerolactone; nitrile such as acetonitrile; ethers exemplified by ethyl, propyl, butyl and amyl ethers; ethers of mono- and diethylene glycol; dioxane; and compatible mixtures of the foregoing.

As indicated hereinabove, the oxidation reaction is carried out in the presence of an oxidizing catalyst. There are numerous catalysts having utility for the purposes of this invention including catalytically active oxides of metals exemplified by osmium tetroxide, selenium dioxide, vanadium pentoxide, ruthenium tetroxide, chromium trioxide, tungstic pentoxide, molybdenum oxide, titanium trioxide, tantalum pentoxide, and the like. Inorganic peracids such as pertungstic acid, permolybdic acid, pertitanic acid and pertantalic acid likewise demonstrate the deired catalytical activity. In addition to the foregoing, certain metallic halides exemplified, for instance, by tungsten hexachloride, also can be utilized as catalysts. In accordance with the more specific aspects of the invention, particularly with regard to the production of acetol and propylene glycol, osmium tetroxide is especially preferred as the oxidizing catalyst. The osmium tetroxide most advantageously is utilized in its free oxide state, but can, if desired, be used in the form of a complex such as, for example, a complex of osmium tetroxide with p-dioxane.

The catalysts, generally speaking, are employed in low concentrations. In the case of osmium tetroxide, for instance, concentrations of the order of $10^{-8}$ to $10^{-2}$, usually $10^{-6}$ to $10^{-4}$ mole percent are effective in achieving the desired results. The catalyst conveniently may be prepared by dissolving it in an organic solvent which is compatible with the hydrogen peroxide solvent solution and the conditions of the reaction. Exemplary of such a catalyst solution is one formed with osmium tetroxide dissolved in substantially pure tert-butyl alcohol, free from isobutylene.

The method of the present invention may be carried out in a variety of ways. Illustrative procedures which have been found to be satisfactory may be outlined broadly as follows:

(1) By the direct introduction of the unsaturated hydrocarbon under pressure into a closed reaction vessel containing an organic solvent solution of hydrogen peroxide and an oxidizing catalyst.

(2) By the direct introduction, under pressure, of an organic solvent solution of hydrogen peroxide into a closed reaction vessel containing the unsaturated hydrocarbon under pressure together with the catalyst.

The pressure at which the reaction is conducted can vary within appreciable limits. In utilizing the method of the present invention to form acetol and propylene glycol from propylene, for instance, the propylene advantageously is maintained under an initial pressure in the range of from 10 to 80 p.s.i.g., and especially desirably at pressures of from 20 to 60 p.s.i.g. The pressures employed to introduce the organic solvent solution of hydrogen peroxide into the reaction vessel in accordance with illustrative procedure (2) outlined above, advantageously are of a magnitude sufficient to provide hydrogen peroxide solution feed rates of the order of, for example, 10 to 200, usually 50 to 170, milliliters per hour where a 500 milliliter reactor is employed. The pressure of the propylene in the reaction vessel determines the solubility rate of the propylene in the hydrogen peroxide solution entering the vessel, the solubility rate increasing with increased propylene pressures. Feed rates falling within the ranges specified can be regulated in any manner known in the art utilizing, for example, suitable fluid pumping apparatus.

The reaction between the unsaturated hydrocarbon and the hydrogen peroxide is exothermic in character and, accordingly, proper provision should be made for controlling the temperature within the reaction zone within limits consistent with the production of optimum yields. The reaction rate and, therefore, the exothermicity of the reaction, will, in large measure, be dependent upon the nature of the unsaturated hydrocarbon utilized. Generally speaking, excellent results can be attained at temperatures in the range of from 10 to 100°, usually 20 to 80°, more or less. In the production of acetol from propylene, greater selectivity toward acetol production and higher efficiency consumptions of hydrogen peroxide are, among other factors, favored by higher temperatures, namely, temperatures in the range of 40 to 80° C., more or less.

While time control of the oxidation reaction is not critical, it has been found that the character of the products obtained in accordance with the practice of the present invention is influenced by the length of time the reaction is allowed to proceed. Long reaction times, for example, from 1 to 3 hours, or more, generally favor the production of higher oxidation products. Short reaction times, that is, from 5 to 45 minutes, more or less, generally favor the production of α-hydroxy carbonyls. More specifically in this connection, oxidation of propylene by the method of this invention produces optimum yields of acetol within 30 minutes, usually within 5 to 15 minutes. If the reaction is allowed to proceed beyond the stated time periods, increased yields of normally produced higher oxidation products such as, for example, pyruvaldehyde from the further oxidation of acetol and/or propylene glycol are obtained.

The following examples are illustrative of the above described procedures which have been found to be highly useful in the production of oxidation products of unsaturated hydrocarbons, olefinic hydrocarbons in particular, pursuant to the present invention. It should be understood that said examples are only illustrative and that various changes may be made therein in the light of the guiding principles disclosed above without in any manner departing from the fundamental teachings contained herein.

*Example I*

Into the 500 milliliter reaction bottle of a Parr hydrogenation apparatus (Parr Instrument Company), equipped with a copper water-cooled coil for controlling temperature, are poured 50 ml. of a 0.26 molar hydrogen peroxide solution in tert-butyl almohol and 5 ml. of a 2 weight percent solution of osmium tetroxide in tert-butyl alcohol. The reservoir of the apparatus is pressurized to 60 p.s.i.g. with propylene and the apparatus is activated. An immediate drop in propylene pressure is noted as a portion of the propylene dissolves in the solvent. After 15 minutes the reactor is stopped and evacuated of propylene. Analysis of the products in the bottle shows a yield (based on $H_2O_2$) of 70.7 percent acetol and 26.6 percent propylene glycol.

*Example II*

The Parr apparatus utilized in Example I is connected to a Lapp pump which is calibrated to provide a feed rate of 170 ml. per hour. The Lapp pump reservoir burette is filled with 50 ml. of a 0.26 molar hydrogen peroxide solution in tert-butyl alcohol. Into the Parr reaction bottle, 10 ml. of a 2 weight percent solution of osmium tetroxide in tert-butyl alcohol are poured. The reservoir of the Parr apparatus is pressurized to 50 p.s.i.g. with propylene. The Lapp pump and the Parr apparatus are activated. After 30 minutes the pump and the Parr apparatus are turned off. Analysis of the products in the bottle shows a yield (based on $H_2O_2$) of 58.6 percent acetol and 33.5 percent propylene glycol.

*Example III*

The procedure described in Example I is followed except that the Parr apparatus is charged to a pressure of 45 p.s.i.g. with methylacetylene. The reaction is stopped after 45 minutes and the Parr reaction bottle is evacuated. The reaction mixture gives a strong positive dinitrophenylhydrazine test for carbonyl products. Analysis of the products obtained shows a good yield (based on $H_2O_2$) of pyruvaldehyde.

The production of α-hydroxycarbonyl and α-dicarbonyl derivatives from a wide variety of unsaturated hydrocarbons, in accordance with the practice of the present invention is illustrated in the following table. The hydrocarbons listed include terminal straight-chain olefins, internal straight-chain olefins, alkyl substituted olefins, aromatic substituted olefins as well as an alkylated acetylene. The production of substantial amounts of the corresponding α-hydroxycarbonyl and α-dicarbonyl derivatives of the listed olefins was confirmed by infrared, gas-liquid chromatographic analysis and the dinitrophenylhydrazine reagent test.

TABLE

| Olefin[1] | Conditions | | DNP Test[2] |
|---|---|---|---|
| | Temp., °C. | Time, hr. | |
| Propene | 20-40 | ½ | +++ |
| Trans-butene-2 | 20-reflux | ½ | +++ |
| Pentene-1 | ---do--- | ½ | +++ |
| Pentene-2 | ---do--- | ½ | +++ |
| 2-methylbutene-1 | ---do--- | ½ | + |
| 2-methylbutene-2 | ---do--- | ½ | + |
| Cis-4-methylpentene-2 | ---do--- | ½ | ++ |
| Trans-4-methylpentene-2 | ---do--- | ½ | +++ |
| Hexene-2 | ---do--- | ½ | +++ |
| Heptene-3 | ---do--- | ½ | ++ |
| Octene-2 | ---do--- | ½ | ++ |
| 2,4,4-trimethylpentene-2 | ---do--- | ½ | ++ |
| 2,6-dimethylheptene-3 | ---do--- | ½ | ++ |
| 2-butyne | 50 | 72 | ++ |
| Styrene | 20-reflux | ½ | +++ |
| Cis-stilbene | ---do--- | ½ | +++ |
| Trans-stilbene | ---do--- | ½ | +++ |

[1] Infrared spectra of product mixtures all show strong carbonyl absorption in the region 5.75-6.1 m$\mu$.
[2] Key: (−) negative; (+) positive; (++) very positive; (+++) very positive.
DNP = dinitrophenylhydrazine.

It should be understood that while the reactions of the present invention are preferably carried out with the olefins dissolved in the liquid phase, the reactions can occur in the vapor phase, and the invention is not to be considered as being restricted as to the phase in which it is carried out.

What is claimed is:

1. A method of producing ketols from hydrocarbons containing an olefinic or acetylenic linkage comprising contacting, at a pressure of from about 10 to about 80 p.s.i.g., a hydrocarbon containing an olefinic or acetylenic linkage with an organic solvent solution of hydrogen peroxide in the presence of an oxidizing catalyst, the molar concentration of hydrogen peroxide in the organic solvent solution ranging from about 0.1 to about 2, said oxidizing catalyst being selected from a member of the group consisting of osmium tetroxide, selenium dioxide, vandium pentoxide, ruthenium tetroxide, chromium trioxide, tungstic pentoxide, molybdenum oxide, titanium trioxide, tantalum pentoxide, pertungstic acid, permolybdic acid, pertitanic acid, pertantalic acid, and tungsten hexachloride, allowing the hydrocarbon and the hydrogen peroxide to react at a temperature of from about 10° C. to about 100° C. for a period of from about 5 to about 45 minutes, and recovering the ketol formed.

2. A method of producing α-ketols from olefinic hydrocarbons comprising contacting, at a pressure of from about 10 to about 80 p.s.i.g., an olefinic hydrocarbon with an organic solvent solution of hydrogen peroxide in the presence of an oxidizing catalyst, the molar concentration of hydrogen peroxide in the organic solvent solution ranging from about 0.1 to about 2, said oxidizing catalyst being selected from a member of the group consisting of osmium tetroxide, selenium dioxide, vanadium pentoxide, ruthenium tetroxide, chromium trioxide, tungstic pentoxide, molybdenum oxide, titanium trioxide, tantalum pentoxide, pertungstic acid, permolybdic acid, pertitanic acid, pertantalic acid, and tungsten hexachloride, allowing the olefinic hydrocarbon and the hydrogen peroxide to react at a temperature of from about 10° to about 100° C. for a period of from about 5 to about 45 minutes, and recovering the α-ketol formed.

3. A method of producing α-ketols from olefinic hydrocarbons comprising contacting, at a pressure of from about 20 to about 60 p.s.i.g., an olefinic hydrocarbon with an organic solvent solution of hydrogen peroxide in the presence of an oxidizing catalyst, the molar concentration of hydrogen peroxide in the organic solvent solution ranging from about 0.1 to about 0.9, said oxidizing catalyst being selected from a member of the group consisting of osmium tetroxide, selenium dioxide, vandium pentoxide, ruthenium tetroxide, chromium trioxide, tungstic pentoxide, molybdenum oxide, titantium trioxide, tantalum pentoxide, pertungstic acid, permolybdic acid, pertintanic acid, pertantalic acid, and tungsten hexachloride, allowing the olefinic hydrocarbon and the hydrogen peroxide to react at a temperature of from about 20° to about 80° C. for a period of from about 5 to about 45 minutes, and recovering the α-ketol formed.

4. A method of producing acetol comprising contacting, at a pressure of from about 10 to about 80 p.s.i.g., propylene with an organic solvent solution of hydrogen peroxide in the presence of an oxidizing catalyst, the molar concentration of hydrogen peroxide in the organic solvent solution ranging from about 0.1 to about 2, said oxidizing catalyst being selected from a member of the group consisting of osmium tetroxide, selenium dioxide, vandium pentoxide, ruthenium tetroxide, chromium trioxide, tungstic pentoxide, molybdenum oxide, titanium trioxide, tantalum pentoxide, pertungstic acid, permolybdic acid, pertitanic acid, pertantalic acid, and tungsten hexachloride, allowing the propylene and the hydrogen peroxide to react at a temperature of from about 10° to about 100° C. for a period of from about 5 to about 45 minutes, and recovering the acetol formed.

5. A method of producing acetol comprising contacting, at a pressure of from about 20 to about 60 p.s.i.g., propylene with an organic solvent solution of hydrogen peroxide in the presence of an oxidizing catalyst, the molar concentration of hydrogen peroxide in the organic solvent solution ranging from about 0.1 to about 0.9, said oxidizing catalyst being selected from a member of the group consisting of osmium tetroxide, selenium dioxide, vanadium pentoxide, ruthenium tetroxide, chromium trioxide, tungstic pentoxide, molybdenum oxide, titanium trioxide, tantalum pentoxide, pertungstic acid, permolybdic acid, pertitanic acid, pertantalic acid, and tungsten hexachloride, allowing the propylene and the hydrogen peroxide to react at a temperature of from about 20° to about 80° C. for a period of from about 5 to about 45 minutes, and recovering the acetol formed.

6. A method of producing acetol comprising contacting, at a pressure of from about 40 to 60 p.s.i.g., propylene with an organic solvent solution of hydrogen peroxide in the presence of osmium tetroxide, the molar concentration of hydrogen peroxide in the organic solvent solution ranging from about 0.1 to about 0.5, allowing the propylene and the hydrogen peroxide to react at a temperature of from about 40 to about 75° C. for from about 5 to about 30 minutes, and recovering the acetol formed.

References Cited

UNITED STATES PATENTS

| 2,373,942 | 4/1945 | Bergsteinsson | 260—635 |
| 2,402,566 | 6/1946 | Milas | 260—594 |
| 2,808,442 | 10/1957 | Smith et al. | 260—594 |

LEON ZITVER, *Primary Examiner.*

DANIEL D. HORWITZ, *Examiner.*